Nov. 13, 1962 H. KRAUSS 3,063,460
CONTROL SYSTEM FOR PIPE LINE TURBINES
Filed Oct. 3, 1958 5 Sheets-Sheet 2
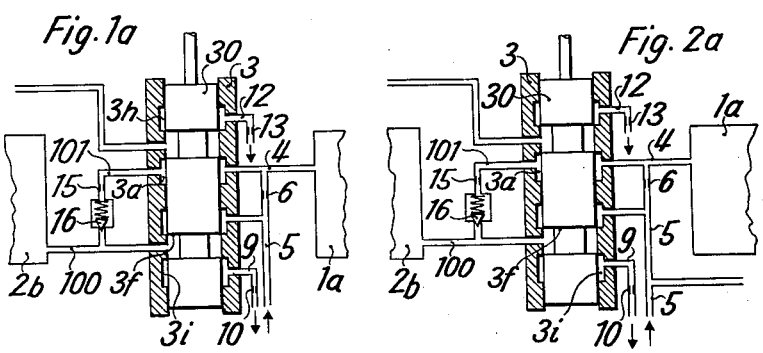
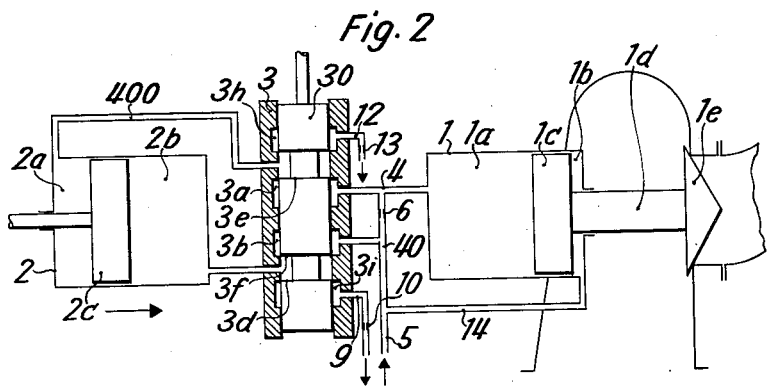
INVENTOR.
Hans Krauss
BY
Patent Agent Nov. 13, 1962  H. KRAUSS  3,063,460
CONTROL SYSTEM FOR PIPE LINE TURBINES
Filed Oct. 3, 1958  5 Sheets-Sheet 3

INVENTOR.
Hans Krauss
BY
Patent Agent.

Nov. 13, 1962   H. KRAUSS   3,063,460
CONTROL SYSTEM FOR PIPE LINE TURBINES
Filed Oct. 3, 1958   5 Sheets-Sheet 4

INVENTOR.
Hans Krauss
BY
Patent Agent

Nov. 13, 1962

H. KRAUSS 3,063,460

CONTROL SYSTEM FOR PIPE LINE TURBINES

Filed Oct. 3, 1958

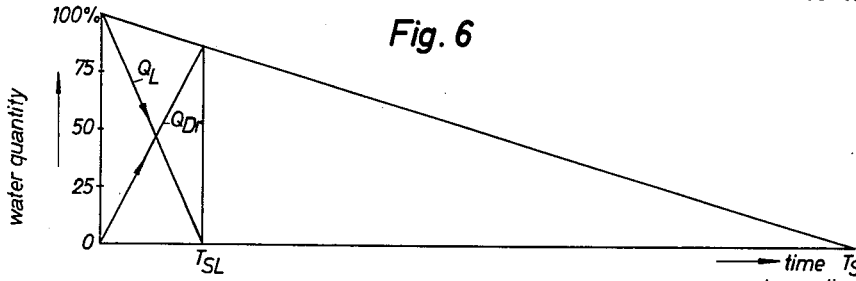

Fig. 6

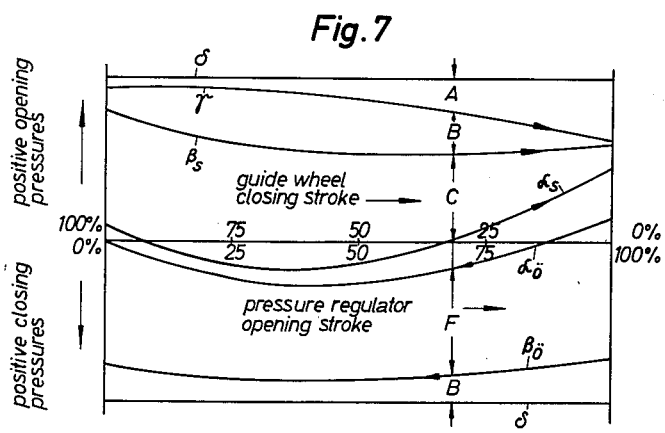

Fig. 7

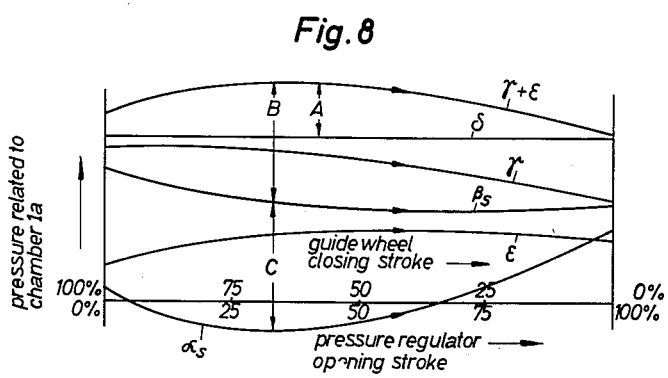

Fig. 8

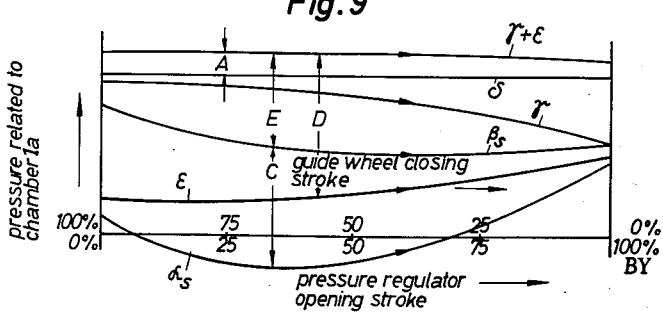

Fig. 9

$T_{SL}$ = closure time of the guide wheel $T_{SDr}$ = closure time of the pressure regulator $Q_L$ = water quantity through guide wheel $Q_{Dr}$ = water quantity through pressure regulator $\alpha_s$ = minimum pressure for closing guide wheel $\alpha_ö$ = minimum pressure opening guide wheel $\beta_s$ = pressure including flow resistances for closing guide wheel $\beta_ö$ = pressure including flow resistances for opening guide wheel $\gamma$ = pressure exerted by the water upon $F_W$, translated for chamber 1a $\delta$ = minimum pump pressure $\varepsilon$ = pressure in chamber 1b translated for chamber 1a A = pressure drop in orifice 6

B = flow resistances in conduits

C = flow resistance of orifice 10 (of orifice 19 in Fig. 8)

D = flow resistance at control edge 3k

E = flow resistances at control edge 3e and in conduits

F = flow resistance of orifice 13

$F_W$ = cross section of closure cone 1e

INVENTOR.

Hans Krauss

BY

[signature]

United States Patent Office 3,063,460
Patented Nov. 13, 1962

3,063,460
CONTROL SYSTEM FOR PIPE LINE TURBINES
Hans Krauss, Heidenheim, Germany, assignor to J. M.
Voith G.m.b.H., Heidenheim, Germany
Filed Oct. 3, 1958, Ser. No. 765,716
Claims priority, application Germany, Oct. 4, 1957
20 Claims. (Cl. 137—25)

With water turbines receiving their pressure or actuating water through a long presser conduit, pressure regulating valves, i.e. controlled relief valves, are inserted in the conduit by means of which excessively high increases in pressure in the pressure conduits or pipes are prevented, especially during fast closing movements of the guiding apparatus or distributor of the turbine. These pressure regulating valves are, during the closing movements of the distributor, opened at the same time to such an extent that the quantity of water which can not pass through the adjusted distributor of the turbine will be able to escape through said pressure regulating valve. This means that the closing rate of the distributor must, at least very generally, equal the opening rate of the pressure regulating valve. Thereupon, the pressure regulating valve closes so slowly that due to the retardation in the water masses in the pressure conduit to the new inertia velocity, no pressure shock higher than from 10 to 15% of the static drop will occur.

The closing period of the turbine guiding apparatus or distributor will be selected at least for such a period that also if the pressure control valve should fail, the conduit will not be subjected to a pressure shock exceeding 50%. The conduits are usually tested under the said higher pressure prior to putting said conduits into operation so that also in this exceptional case the conduit or pipe will not break.

The customary control of pressure regulating valves consists of a link system by means of which the control valve of the pressure control will be affected in opening direction in mechanical conformity with the closing movement of the guiding apparatus or distributor. A return mechanism will assure that the pressure regulating valve will be opened to such an extent only that the guiding apparatus or distributor will close. The return mechanism is provided with an oil brake which returns the pressure regulating valve gradually to its closing position after the pressure regulating valve has carried out its respective operation. In this form, the pressure control will not prevent a failure. Therefore, as mentioned above, the guiding apparatus or distributor adjusting motor is from the very start designed for a closure period with 50% pressure increase. If desired, an additional device may be provided by means of which the long closing period is made effective only at the minute when the pressure control valve fails. Such a device, however, is rather complicated and expensive and, therefore, in most instances is not used.

In the course of the further development of the water turbine art, continuously bigger and bigger power units have been built as a result of which also the closure periods of the turbine on long pressure pipes had to become bigger and bigger in the light of the above mentioned factors.

Turbines to which the operating water is fed through pressure pipes, in most instances draw their water from storage basins. Therefore, these turbines are employed for regulating the load peaks of a network in order to allow the turbine governor to follow the fast variations in the frequency of the network and to regulate the same. It has already been suggested to eliminate the damping of the turbine governor as long as the generator is coupled to the network. While in this way with installations without pressure regulating valve the optimum of the regulating speed is obtained by the adjusted closing and opening time, with installations equipped with pressure regulating valves, it is possible to increase the closing speed only whereby the maintenance of the frequency during the relief operations can be improved. This, however, necessitates the employment of a pressure regulating valve control which assures an absolute safety against a failure.

According to a heretofore known arrangement meeting the above mentioned requirements, the adjusting motor of the guiding apparatus or distributor is equipped with a differential piston the opening side of which is to say, the side which is pressurized to open the distributor, has approximately twice the cross section as the closing side which is to say, the side which is pressurized to close the distributor. In this instance the closing side with the small piston displacement is through a pipe connected directly with the closure side of the smaller stage of a two-stage adjusting motor of the pressure regulating valve or with an oil pressure part and a water pressure part of such adjusting motor. In contrast thereto, the opening side of the adjusting motor for the guiding apparatus or distributor is acted upon by a control valve which in its turn is acted upon by the turbine governor.

This solution requires a considerable number of parts and is expensive inasmuch as particularly expensive adjusting motors for the guiding apparatus or distributor and for the pressure regulating valve are required and in addition thereto also the control valve for the motor of the guiding apparatus or distributor must be about twice as big as heretofore customary.

It is, therefore, an object of the present invention to provide an arrangement of the above mentioned type, which will overcome the drawbacks set forth above with heretofore known arrangements.

It is another object of this invention to provide control means for pipe line turbines with hydraulically coupled guiding apparatus and adjusting motor for the pressure control, which makes it possible to employ simple ordinary adjusting motors as adjusting motor for the guiding apparatus and also for the pressure control.

It is a further object of this invention to provide a control mechanism of the type set forth in the preceding paragraph, which will make it possible to design also the control valve small and inexpensive.

A still further object of this invention consists in the provision of a control mechanism of the above mentioned type, which will eliminate the employment of link systems, special control valves for the pressure control, and also the employment of an oil brake.

These and other objects and advantages of the present invention will appear more clearly from the following specification in connection with the accompanying drawings in which:

FIG. 1 diagrammatically illustrates an arrangement according to the present invention in cooperation with a pressure pipe turbine, said arrangement being designed for a situation according to which, when the load on the turbine is relieved with the result that the turbine speed increases for instance more than 1% of the normal speed, the adjusting oil quantity required on the closing side of the pressure control motor will be calculated as substantially equaling that adjusting oil quantity required on the closure side of the guide wheel.

FIG. 2 represents an arrangement according to the invention which is designed for a situation according to which, when the load on the turbine is relieved, the adjusting oil quantity required on the closing side of the pressure control motor will be calculated to amount to only slightly less than the required adjusting oil quantity on the closure side of the guide wheel adjusting motor.

FIG. 2a represents a slight modification over the arrangement of FIG. 2.

Figure 5:
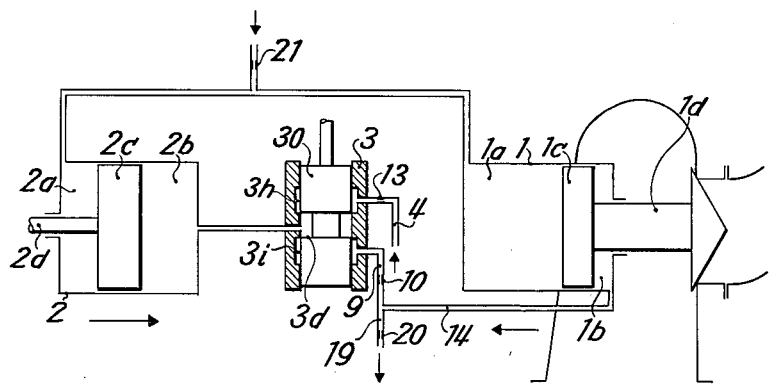
FIG. 5 represents a further embodiment of an arrangement according to the invention.
Figure 5A:
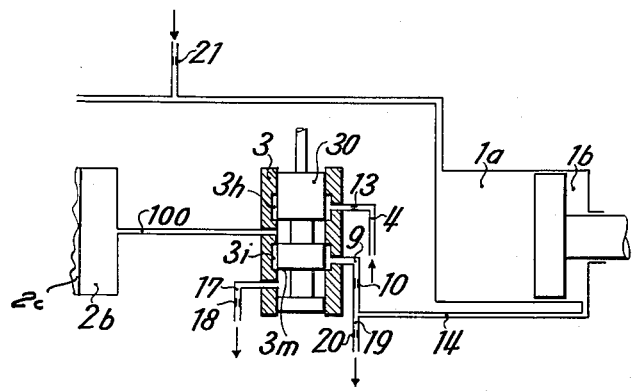

FIG. 5a differs from that of FIG. 5 primarily in that the control valve is provided with a special discharge conduit with orifice, while the control valve spool has an additional control edge.

FIG. 6 represents a graph showing the decrease of the water quantity passing through the guide wheel and the increase of the water quantity passing through the pressure controlling device within a time $T_{SL}$.

Figure 1:
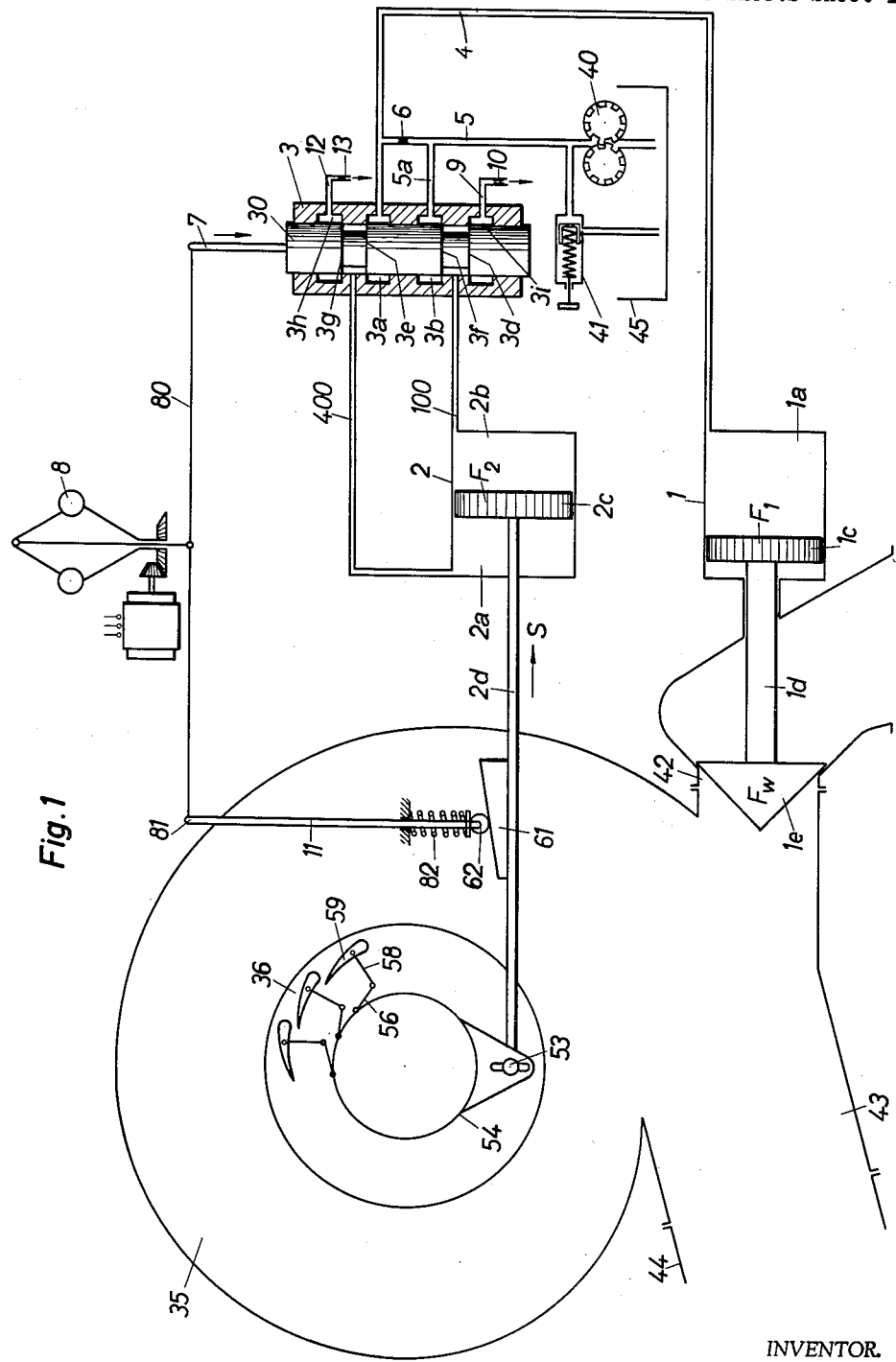
FIG. 1a is a modification over the arrangement of FIG. 1.

FIG. 7 illustrates by means of a diagram for the arrangement of FIGS. 1 and 2 the pressure conditions in the individual servomotor chambers in conformity with the respective opening of the guide wheel and pressure control device.

Figure 3:
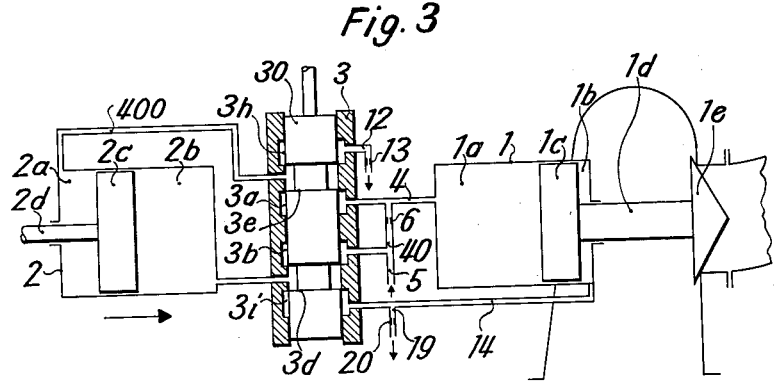
FIG. 3 shows an arrangement according to the invention which is designed for a situation according to which, when the load on the turbine is relieved, the required adjusting oil quantity on the closure side of the pressure control motor will be calculated to amount to only slightly more than the required adjusting oil quantity on the closure side of the guide wheel adjusting motor.

FIG. 8 illustrates, similar to FIG. 7, the pressure conditions in the individual servomotor chambers in conformity with the respective opening of the guide wheel and pressure control device, however, for the arrangements of FIGS. 3 and 5.

Figure 4A:
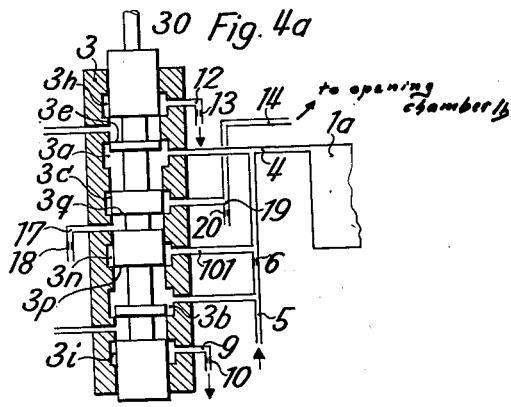
FIG. 4a illustrates an arrangement which differs from that of FIG. 4 primarily in that the control valve comprises an additional annular passage and two additional control ledges.
Figure 4:
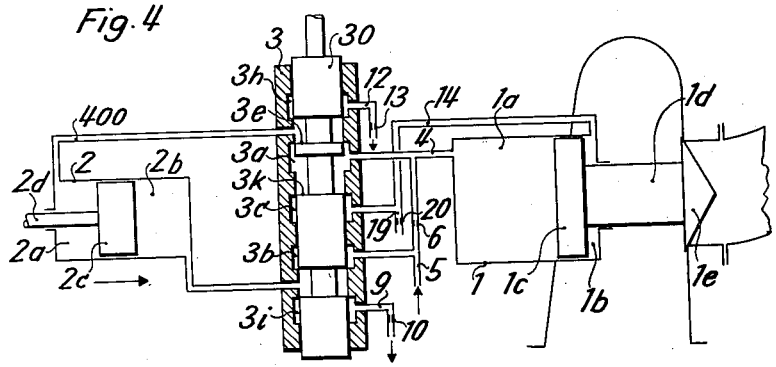
FIG. 4 represents an arrangement according to the invention which is designed for a situation according to which, when the turbine is relieved, the required adjusting oil quantity on the closure side of the pressure control motor is calculated as being considerably higher than the required adjusting oil quantity on the closure side of the guide wheel adjusting motor.

FIG. 9 shows, similar to FIGS. 7 and 8, the pressure conditions in the individual servomotor chambers in conformity with the respective opening of the guide wheel and pressure control device, however, for the arrangement of FIG. 4.

The arrangement shown in FIG. 1 comprises an adjusting motor 1 for the pressure regulator and an adjusting motor 2 for the guiding apparatus 36 of the turbine 35. The adjustment of the guiding apparatus 36 is effected by the guide wheel adjusting motor 2 the piston 2c of which is connected to the control ring 54 through the intervention of a piston rod 2d and a pivot 53. Guide vanes or gates 59 are linked to the control ring 54 by means of levers 56 and 58. At the entrance of the coiled casing 43 there is arranged the auxiliary valve outlet 42 which is operable by the pressure adjusting motor 1 the piston 1c of which is connected with the closure cone 1e through the piston rod 1d. The side 1a of the pressure control or pressure adjusting motor 1 which is placed under pressure to close the pressure regulator, and the closure side 2a of the guide wheel adjusting motor 2 which is placed under pressure to close the guiding apparatus, communicate with each other through conduits 4 and 400 and a hydraulic control valve 3 interposed between said two conduits. Control valve 3 comprises a valve spool 30 which is connected to speed governor 8 through the intervention of a rod 7 and a lever 80 so that valve spool 30 will be controlled by governor 8 in conformity with the speed of the turbine 35. The left end of lever 80 has linked thereto at 81 a return rod 11 with roller 62. A spring 82 associated with roller 62 continuously maintains the latter in engagement with a return cam 61 mounted on piston rod 2d and illustrated in simplified form.

Control valve 3 is provided with four annular passages 3a, 3b, 3i and 3h. Valve spool 30 is provided with control edges 3g, 3e, 3f and 3d. As will be seen from FIG. 1, annular passage 3h communicates with a discharge conduit 12 comprising an orifice 13. Annular passage 3i communicates with a discharge conduit 9 comprising an orifice 10. The opening side 2b of the guide wheel adjusting motor 2 communicates through a conduit 100 with the control valve 3. The required pressure oil is furnished by a continuously delivering pump 40 through conduit 5 with orifice 6 and a conduit 5a. Conduit 5 with orifice 6 leads into conduit 4 which in its turn communicates with annular passage 3a on one hand and with the side 1a of the pressure adjusting motor 1 on the other hand. Conduit 5a branching off from conduit 5 communicates with annular passage 3b. The side 1a of the pressure adjusting motor 1 and also the annular passages 3a and 3b will thus continuously communicate with pump 40. Conduit 5 furthermore communicates with a pressure relief valve 41 which acts as a safety valve and limits the pressure furnished by pump 40 to a desired maximum value. The excess pressure oil delivered by the pump will thus be able to return to an oil reservoir 45 through said pressure relief valve 41.

FIG. 1 shows the valve spool 30 of control valve 3 as occupying its intermediate position which corresponds to a certain momentary retained speed of the turbine. In this position of the valve spool 30, the control edge 3g prevents communication between conduit 400 leading to the closure side 2a of the guide wheel adjusting motor 2 and conduit 12 connected to the annular passage 3h and provided with orifice 13. Similarly, in the position shown in FIG. 1, control edge 3e of valve spool 30 prevents communication between conduit 400 and conduit 4 communicating with the annular passage 3a and leading to the side 1a of the pressure adjusting motor 1. At the same time, in the position shown in FIG. 1, control edge 3f prevents communication between conduit 100 leading to the side 2b of the guide wheel adjusting motor 2 which side is placed under pressure to open the guide wheel, and branch conduit 5a branching off from pump feed line 5 and communicating with annular passage 3b. Similarly, control edge 3d of valve spool 30, when occupying the position shown in FIG. 1, prevents communication between conduit 100 and discharge conduit 9 provided with orifice 10 and leading to annular passage 3i. Thus, in the position shown in FIG. 1, pressure oil can neither be delivered to nor discharged from side 2b or the side 2a of the guide wheel adjusting motor 2. Piston 2c of the guide wheel adjusting motor 2 is thus blocked in the position shown so that the hydraulic forces of the actuating water acting upon the guide vanes 59 cannot bring about an adjustment of said guide vanes. At the same time, however, pump 40 communicates with the side 1a of motor 1 through conduit 5, orifice 6, and conduit 4. This means that piston 1c of the pressure adjusting motor 1 will be acted upon by pressure oil so as to maintain the auxiliary outlet valve 42 closed. In this instance, the pressure of the pressure oil in the chamber 1a will correspond to the maximum permissible pump pressure adjusted by means of the pressure relief valve 41. The said pressure in chamber 1a is so selected that the force exerted by piston 1c, said piston having a cross section $F_1$, will safely hold the closure cone 1e in its closing position against the force exerted by the pressure of the actuating water exerted upon the cross section $F_w$ of the closure cone 1e.

If, due to a sudden considerable relief of the turbine, the turbine speed increases considerably, the speed governor 8 will, by means of lever 80 and rod 7, displace the valve spool 30 to a considerable extent from the intermediate position shown in FIG. 1 in a downward direction with regard to FIG. 1. As a result thereof, control edge 3e now permits the pressure oil to pass from conduit 4 to conduit 400, while the pressure edge 3d now permits communication of conduit 100 with discharge conduit 9 containing orifice 10. Control edge 3g will occupy a position in which conduit 400 does not communicate with discharge conduit 12 comprising orifice 13, whereas control edge 3f will now as before prevent communication between conduit 100 and conduit 5a. From the above, it will be evident that in the thus mentioned position of valve spool 30, the side 1a of motor 1 and the side 2a of motor 2 are hydraulically connected to each other through conduit 400, annular passage 3a and conduit 4. Thus, pressure oil can relatively quickly be discharged from side 2b of guide wheel adjusting motor 2 through conduit 100, annular passage 3i and discharge conduit 9 with orifice 10. As a result thereof, the pressure acting upon the side 2b and thus also the pressure on side 2a will drop quickly. When this occurs, the quantity of oil delivered by pump 40 is not sufficient any longer to move the guide wheel adjusting motor piston 2c and to maintain the pressure necessary to keep the closure cone 1e closed. Therefore, the water pressure acting upon the closure cone 1e will cause the cone to move and expel oil from side 1a of motor 1. This oil will be able through conduit 4, annular passage 3a and conduit 400 to act on side 2a of motor 2 and move the piston 2c in closing direction. Thus, the two adjusting motors are hydraulically coupled to each other. Accordingly, the closure of the guiding apparatus 36 will be effected to the same extent as the closure cone 1e will be opened and in this way, allows a portion of the actuating water to be discharged through the auxiliary discharge 42. The closure period of the guiding apparatus and the opening period of the cone 1e will be determined by the orifice 10 in discharge conduit 9. In view of the situation just described, the speed of turbine 35 drops and, accordingly, also the speed of the governor 8 decreases so that lever 7 and together therewith the valve member 30, will be adjusted in upward direction. At the same time, the closing movement of the guiding apparatus 36 is also conveyed by the return cam 61 through roller 62 and return rod 11 upon lever 80 to pivot it about its connection with the governor whereby valve spool 30 will be returned to its intermediate position. As a result thereof, the control edges 3e and 3d again prevent communication between conduits 400 and 4 and also between conduits 100 and 9 so that piston 2c of the motor 2 and thus the guide vanes 59 will again be blocked in their respective position. Pressure oil delivered by pump 40 will now pass through conduit 5, orifice 6 and conduit 4 to the side 1a of the pressure adjusting motor 1 to thereby displace piston 1c in the direction toward the left with regard to FIG. 1 whereby closure cone 1e will again bring about closure of auxiliary discharge 42. The closing period of the pressure adjusting motor 1 will be determined by the orifice 6 which is so dimensioned that the auxiliary discharge opening 42 can be closed only slowly so that pressure shocks will safely be avoided in the pressure line.

Inasmuch as at a slight relief of the turbine, in other words at a slight increase in speed of the turbine, dangerous pressure shocks will not occur in the pressure line in the same way as they will not occur when the load slightly increases or the speed slightly decreases, it is necessary to avoid that a portion of the valuable actuating water will be discharged unused through the auxiliary discharge. This desired situation at a slight increase in speed of the turbine is assured by the servomotor system according to FIG. 1 due to the fact that the speed governor will under the mentioned condition move the control spool 30 only slightly downwardly from its intermediate position so that the control edges 3e and 3d will only free a slight or minor cross section through which communication is established between conduits 400 and 4 and between conduits 100 and 9, in other words, a considerable throttling effect will be exerted. The pressure oil can therefore be discharged only slowly from the opening side 2b of motor 2 through conduit 100, annular passage 3i and conduit 9 with orifice 10. Similarly, the pressure oil can only slowly flow to the side 2a of motor 2 through conduit 5 and orifice 6, annular passage 3a and conduit 400. Therefore, pump 40 will be able to deliver the small quantity of pressure oil required for the displacement of piston 2c of motor 2 and thus for the adjustment of the guiding apparatus 36 in conformity with the change in the speed, while the pump will simultaneously maintain the oil pressure on the side 1a of motor 1, which oil pressure is provided for maintaining the pressure adjusting motor 1 or, more specifically, cone 1e closed. The auxiliary discharge 42 will thus safely be maintained closed also during the adjustment of the guiding apparatus 36 in conformity with the change in the speed of the turbine.

Due to the closing movement of the guiding apparatus, the speed of the speed governor 8 drops and brings about a displacement of the valve spool 30 in upward direction with regard to FIG. 1. At the same time, also the left end 81 of lever 80 will be adjusted in upward direction by means of cam 61, roller 62 and return rod 11. Valve spool 30 will be returned to its intermediate position and control edges 3e and 3d again interrupt communication between conduits 400 and 4 and between conduits 100 and 9. Thus, piston 2c of motor 2 will again be blocked so that the forces of the actuating water acting upon the guide vanes 59 cannot bring about any adjustment. At the same time, the closure cone 1e will be maintained in its closing position by the pressure of the oil acting upon piston 1c.

When the turbine is under a great load, its speed drops considerably and thereby also the speed of the speed governor 8. In view of the decrease in the speed of the governor 8, the latter tilts lever 80 about point 81 which at first is to be considered as a fixed point, said tilting movement being effected in counter-clockwise direction. As a result thereof, valve spool 30 is by means of rod 7 moved by a corresponding distance from its intermediate position in upward direction. As a result of this movement of the valve spool 30, control edge 3f will allow unimpeded passage of pressure oil from pump 40 through conduits 5, 5a, annular passage 3b and conduit 100 to the side 2b of guide wheel adjusting motor 2. Similarly, control edge 3g permits the pressure oil from side 2a of motor 2 to be discharged through conduit 400 and annular passage 3h into conduit 12 with orifice 13.

In view of the pressure delivered by pump 40, piston 2c of motor 2 will be moved toward the left as fast as orifice 13 will permit because at the side 2a a counter pressure will build up which corresponds substantially to the flow resistance of orifice 13 inasmuch as control edge 3f and 3g have no throttling effect in this connection. Since during the adjustment of piston 2c, closure cone 1e is to be retained in its closing position, it will be obvious that the delivery of the pump has to be so dimensioned that it will furnish the oil quantity required for the displacement of piston 2c and at the same time will assure the maintenance of the pressure required to maintain auxiliary outlet 42 closed and acting upon the side 1a of the pressure adjusting motor 1. Due to the opening of the guide wheel 36 as brought about by the guide wheel adjusting motor 2, the speed of the turbine and accordingly the speed of governor 8 will increase again. At the same time, the return rod 11 is moved upwardly through the intervention of the return cam 61 and roller 62. Valve spool 30 is returned to its intermediate position through the intervention of lever 80 and rod 7. The control edges 3f and 3g again interrupt the previously freed connection between the conduits. The guide wheel is again blocked, whereas the closure cone is further maintained in its closing position.

When the turbine is under a slight load only, the valve spool 30 is moved only slightly upwardly from its intermediate position. The control edges 3f and 3g establish communication between the conduits 400 and 12 and 100 and 5a, however, only slightly and exert a considerable throttling effect, whereas orifice 13 in conduit 12 will now not have any throttling effect. Thus, in this instance, the control edge 3f determines the counter pressure on the closing side 2a and thereby the adjusting speed for piston 2c. In other words, the course of the control operation is the same as described above when the turbine is under a great load, i.e. when a considerable drop in the speed of the turbine occurs.

FIG. 6 illustrates the decrease within the time period $T_{SL}$ of the quantity of water passing through the pressure regulator or control motor. Depending on the ratio of the guide wheel closure time $T_{SL}$ to the pressure control motor closing time $T_{SDr}$, the pressure control motor will have to discharge a maximum quantity of water which is less than the maximum quantity of water previously passing through the guiding apparatus. If, for instance, the guide wheel closure time $T_{SL}$ amounts to 10% of the pressure control motor time $T_{SDr}$, the maximum pressure control quantity $Q_{Dr}$ will be only 90% of the maximum guide wheel quantity of water $Q_L$. The total of the quantities of water passing through the guide wheel and the pressure regulator motor, will decrease in conformity with the above mentioned law within a time $T_{SDr}$ within which no harmful pressure shock will endanger the pipe line.

It will be appreciated that the ordinary control of a pressure control motor is so effected that first the guiding apparatus begins to close, and that the control of the pressure control motor is effected by the guide wheel movement. Due to the fact that the pressure control motor opens after the guide wheel has closed, nevertheless a certain pressure shock will occur which cannot be eliminated by the customary control type.

The pressure conditions for the arrangement of FIG. 1 are illustrated by the diagram of FIG. 7. In this diagram, the closing and opening strokes of the guide wheel and of the pressure adjusting motor are plotted over the abscissa, whereas the positive pressures during the closing of the guide wheel are plotted over the ordinate. The positive pressures during the opening of the guide wheel are plotted over the negative portion of the ordinate.

When slowly closing the guide wheel while starting from guide wheel opening completely open, the pressure required for this purpose corresponds to the graph $\alpha_s$ in the direction of the arrow. With a fast closing movement of the guide wheel, as it is normally effected, a pressure corresponding to the flow resistance of orifice 10 will build up in chamber 2b. Due to this counter pressure in chamber 2b, however, also the pressure in chamber 2a will increase. The pressure course during a fast closing of the guide wheel will then correspond to graph $\beta$ which with each guide wheel opening corresponds to a pressure which is higher than the graph $\alpha_s$ by the amount C which equals the increase in pressure due to the resistance of orifice 10. The pressures according to graph $\alpha_s$ are, however, considerably less than those according to graph $\gamma$ required for maintaining the pressure adjusting motor closed. The pressures according to graph $\gamma$ are determined by the pressures exerted by the actuating water upon the cross section $F_w$ of cone 1e and converted for the surface $F_1$ of piston 1c in conformity with the respective opening position of cone 1e. Thus, the value of graph $\gamma$ plotted over the left portion of the ordinate corresponds to the water pressure acting upon closure cone 1e while the latter is in closed position multiplied by $$\frac{F_w}{F_1}$$

Accordingly, that value of graph $\gamma$ which is plotted over the right portion of the ordinate represents the water pressure for area $F_1$ minus the speed $$\frac{c^2}{2g}$$

at full load —water quantity. Due to the friction losses at the pressure control motor which have only a minor effect on the pressure in chamber 1a, graph $\gamma$ may be considered as applying to the opening as well as to the closing of the pressure adjusting motor. The lowest pressure of pump 40 may be designated with the letter $\delta$. This lowest pressure is independent of the opening of the pressure adjusting motor and of the guide wheel and thus will maintain its constant value with all openings of the guide wheel and of the pressure adjusting motor. This constant value must naturally be higher than the maximum value for maintaining the pressure adjusting motor closed in conformity with graph $\gamma$. The amount A represents the pressure drop at the orifice 6.

If for any reasons with the above described considerable relief of the turbine, the pressure adjusting motor should not open even though valve spool 30 has been adjusted from its intermediate position in downward direction, pressure oil will pass from pump 40 through conduit 5, orifice 6, by the control edge 3e and through conduit 400 into chamber 2a of the guide wheel adjusting motor 2. Motor 2 will then be able to close the guiding apparatus only as slowly as normally the pressure adjusting motor would close. Whereas during the closing of the pressure adjusting motor, normally at orifice 6 a pressure drop will occur of the magnitude of the value A, pump 40 must overcome the amount A plus B in conformity with FIG. 7 if the pressure adjusting motor does not open. Orifice 6 has therefore to be so dimensioned that in this instance motor 2 will close the guiding apparatus not faster than it corresponds to the maximum permissible pressure shock in turbine conduit 44.

The further graphs $\alpha_0$ and $\beta_0$ represent the magnitude of the respective necessary pressure for slow and fast opening respectively of the guide wheel in conformity with the respective opening position of the guide wheel.

FIG. 2 shows the same control system as has been illustrated in FIG. 1 with the exception that the opening chamber 1b of the adjusting motor for the pressure regulator communicates through conduit 14 with the pressure oil feeding or supply line 5. In this way, the displacement of the closure side of the pressure regulator adjusting motor, calculated to be smaller, may be made the same as the displacement of the closure side of the adjusting motor for the guiding apparatus. By correspondingly dimensioning the pressure regulator piston rod 1d, a further corrective step may be carried out if the feeding pressure available does not precisely have the magnitude required for a complete equalization. With regard to the pressure conditions prevailing for the arrangement of FIG. 2, the conditions outlined in connection with FIG. 1 and with FIG. 7 will apply in an analogous manner.

According to the invention, with the arrangement of FIG. 3, the volumes of the opening chambers 1b of motor 1 and the opening chambers 2b of motor 2 described by the effective surfaces of the piston at maximum possible piston stroke have been made equal by correspondingly selecting the diameter of piston rod 1d of pressure adjusting motor 1. In addition thereto, the opening chamber 1b is connected through conduit 14 with the discharge conduit 19 comprising orifice 20. The discharge conduit 19 leads into a fluid reservoir (not shown) below the oil level. In other words, the entire arrangement of this control system corresponds to that of FIG. 1.

In the illustrated position of valve spool 30 pertaining to control valve 3, in other words when the control edges occupy their closing position, a pressure will prevail in closing chamber 1a of motor 1 which is required for maintaining auxiliary discharge 42 closed in conformity with the adjustment of the relief valve 41. This pressure which is furnished by the pump is somewhat higher than the pressure in closing chamber 2a of motor 2 which last mentioned pressure corresponds substantially to the pressure in opening chamber 2b. In contrast thereto, only atmospheric pressure prevails in opening chamber 1b of motor 1. This is due to the fact that this opening chamber 1b continuously communicates through conduits 14 and 19 comprising orifice 20 with the oil reservoir. It may be assumed that the load on the turbine decreases to such an extent that an increase in speed by more than 1% of the normal speed will occur and that in conformity with requirements to be met by modern control devices for control valves, the valve spool 30 has been moved downwardly to such an extent that the control edges 3e and 3d permit full communication between the opening sides 1b and 2b of motors 1 and 2, in other words that the control edges will not exert any throttling effect whatsoever. With this assumption it will be evident that pressure equalization will occur between closure chambers 1a and 2a so that the pressure in chamber 1a will drop somewhat and the pressure in chamber 2a will increase somewhat. At the same time, pressure equalization will take place also between the pressure in opening chambers 1b and 2b. This pressure equalization brings about a considerable drop in the pressure in chamber 2b and a considerable increase in the pressure in chamber 1b. Due to the drop in pressure in closure chamber 1a on one hand and due to the lack of a corresponding counter pressure in opening chamber 2b, the water pressure acting upon closure cone 1a will now be able to open the latter and to bring about movement of piston 1d toward the left. As a result thereof, pressure oil will be conveyed from closure side 1a through control valve 3 to the closure side 2a so that piston 2c of the guide wheel adjusting motor 2 will be moved in rightward direction, i.e. in closing direction.

At the same time, with the above adjustment, piston 2c will convey pressure oil from the opening chamber 2b through control valve 3 to the side 1b of the pressure adjusting motor 1 thereby aiding the opening movement of the closure cone 1e and the displacement of piston 1c toward the left. Due to this additional opening force acting upon piston 1c, the pressure in chamber 1a of the pressure adjusting motor increases and, consequently, also the conduits 4 and 400 and chamber 2a while reaching a value in excess of the pressure of pump 40. During this adjusting operation, the opening chambers 1b and 2b communicate with a discharge 19 so that oil may be discharged from the system through discharge 19 and orifice 20, particularly since also in this part of the system the pressure has increased. In view of the considerable throttling effect of the correspondingly dimensioned orifice 20, the oil quantity being discharged is, however, rather small, for instance approximately 3% of the total quantity of oil in chambers 1b and 2b and the connecting lines. The entire remaining quantity of oil, approximately 97% will, however, remain in the system and will be displaced entirely or partially from chamber 2b into chamber 1b according to the stroke of piston 2c. This displacement will, however, be effected only as fast as the adjusting speed of piston 1c will permit. This means that the guide wheel can close only approximately at the same rate as the pressure adjusting motor will open. During the adjusting operation, an oil quantity will be displaced from the closure side 1a of motor 1 which oil quantity is somewhat greater than the oil quantity displaced to the closing side 2a of motor 2. The differential oil quantity must, therefore, be able to be discharged from the system. This is possible because, as mentioned above, the pressure of the pressure oil which latter is present during the adjusting operation in the closure chambers 1a and 2a and the connecting lines between said chambers in the system, is higher than the pressure of pump 40 for which the relief valve 41 has been adjusted so that the excess quantity of oil can pass from conduit 4 through conduit 5 with orifice 6 and relief valve 41 into the oil reservoir.

After the new state of rest of the guide wheel adjusting motor has been obtained, also valve spool 30 will, by means of the speed governor 8 and the return device 61, 62 and 11 as well as by lever 80 and rod 7, be returned to the position shown in the drawing. The control edges are now in closing position and the guide wheel adjusting motor is blocked. Inasmuch as the pressure oil can be discharged from opening side 1b through conduit 14 and conduit 19 with orifice 20, pump 40 is able to feed through conduit 5 with orifice 6 and conduit 4 the oil at the required pressure necessary for closing the pressure adjusting motor. The closing speed of the pressure adjusting motor will be determined by the throttling effect of orifice 20 whereby a too fast closing movement of the pressure adjusting motor will be prevented. When the load on the turbine is only slightly decreased so that the turbine speed will increase only slightly for instance by 1% of the normal speed, the control operations will take place in the manner described in connection with low and high load operations in the same manner as outlined in detail in connection with FIG. 1.

The pressure conditions have been illustrated in FIG. 8. Graph $\alpha_s$ will also in this instance indicate the necessary control pressure for closing the guide wheel at minor decreases in the load, i.e., at small increases in speed, for instance below 1% of the normal speed. Correspondingly, graph $\beta_s$ indicates the necessary control pressure at greater decreases in the load while considering flow resistances C as they are caused primarily by the orifice 20. The water pressure acting upon the closure cone 1e will decrease along the graph $\gamma$ when the pressure control motor opens. The water pressure must at the end of the opening stroke still be high enough to be able to adjust piston 2c of guide wheel motor 2 in closing direction, which means it must be high enough to be able to close the guiding apparatus. At the opening side 2b and the opening side 1b there will now occur a pressure in conformity with the graph $\epsilon$. This pressure brings about an increase in the pressures in chambers 1a and 2a which pressure is represented by the graph $\gamma+\epsilon$. It will be evident therefrom, that a pressure excess A over the pump pressure $\delta$ will prevail which will bring about that oil will be discharged into the oil reservoir through line 4 and line 5 with orifice 6 and through check valve 41. The difference B between the graph $\gamma+\epsilon$ and the graph $\beta_s$ designates additional flow resistances which will occur in the lines between the adjusting motor sides.

FIG. 4 illustrates an arrangement according to the present invention for a situation for which particularly great differences have been calculated concerning the adjusting oil quantities required for the adjustment of the adjusting motor 2 for the guiding apparatus on the closure side 2a and for the actuation of the pressure regulator adjusting motor at the closure side 1a. According to the present invention, in this instance, the volume swept by the piston rod 1d (volumetric quantity of fluid) of the pressure regulator adjusting motor 1 during a guide wheel closing operation will be adapted to or made substantially equal to the oil volume which during the closure step at the closure side 2a of the adjusting motor 2 will be introduced. This is done by correspondingly selecting the diameter of piston rod 1d. In this connection, control valve 3 is provided with a further annular passage 3c, and the valve spool 30 is provided with an additional control edge 3k. In addition thereto, the opening chamber 1b of the pressure regulator motor 1 communicates through conduit 14 with the annular passage 3c and with the discharge line 19 with orifice 20. The discharge line 19 leads into an oil reservoir (not shown) below the oil level whereby air will be prevented from entering into the system. Similarly, the discharge conduit 9 with orifice 10 and the discharge conduit 12 with orifice 13 lead into said last mentioned oil reservoir below the oil level.

When the control valve spool 30 illustrates the position shown in the drawing, in other words when the control edges are in closing-off position, in the closure chamber 1a of the pressure regulator motor 1 there will prevail a closure pressure required for maintaining the auxiliary discharge opening 42 closed against the pressure of the actuating water acting upon the closure cone 1e, said closure pressure will be created by pump 40 in conformity with the adjustment of the check valve 41. The said closure pressure will, as mentioned in connection with the above described arrangements, be somewhat higher than the pressure in closure chamber 2a of the guide wheel adjusting motor 2. Piston 2c of motor 2 is blocked because the line 400 to the closure side 2a and also the line 100 to the opening side 2b are closed off. Disregarding the hydraulic forces of the actuating water which act upon the guide vanes, it may be assumed that the same pressure prevails in chambers 2a and 2b because there is no pressure drop between these two sides. Due to the continuous connection with the oil reservoir, merely atmospheric pressure will prevail in opening chamber 1b. When a considerable decrease in the load occurs at the turbine, in other words for instance of the magnitude which brings about an increase in the turbine speed by more than 1% of the normal speed of the turbine, control edges 3e, 3d and 3k open up. However, the arrangement and design thereof are so selected that they will exert a throttling effect. The closure chambers 1a and 2a are now hydraulically interconnected, and the pressure oil can flow from the opening chamber 2b through line 9 with orifice 10 into the oil reservoir. Moreover, the opening chamber 1b communicates with the closure chamber 1a through line 14, annular passages 3a and 3c and line 4. When the pressure in opening chamber 2b drops, also the pressure in closure chamber 2a and therefore in chamber 1a of the pressure regulator motor 1 will drop. The water pressure acting upon the closure cone 1e will now be able to discharge a smaller quantity of the oil from the closure side 1a to the closure side 2a, control edge 3e due to its throttling effect preventing too much oil from entering into the closure chamber 2a. Furthermore, piston 1c will discharge a greater quantity of oil into the opening chamber 1b. In addition thereto, a portion of the discharged oil even though only a smaller portion, for instance approximately 3% according to the throttling effect of orifice 20 will be discharged from the system into the oil reservoir.

After the control valve spool 30 has been returned to the position shown in the drawing, oil from pump 40 may pass into closure chamber 1a through feeding line 5, orifice 6 and line 4, and the oil from the opening chamber 1b may be discharged through conduit 19 with orifice 20 whereby the pressure regulator motor will slowly close again. With only small regulating movements during which less oil is used than passes maximally through orifice 6, so much oil will pass through line 5, orifice 6 and by throttling control edge 3e to the closure side 2a of the adjusting motor 2 that the guide wheel can make small slow movements, whereas the pressure regulator motor remains closed. The control operations with the design of FIG. 4 are otherwise the same as those described in connection with FIG. 1.

The pressure conditions pertaining to the arrangement of FIG. 4 are illustrated in FIG. 9, and, more specifically, by the graphs $\alpha_s$, $\beta_s$ and $\gamma_s$ representing the known curves of the regulating pressures and of the water pressure respectively. The character $\epsilon$ designates the pressure in chamber 1b of the pressure regulator motor 1 which pressure $\epsilon$ is necessary in conjunction with the water pressure $\gamma$ to open the pressure regulator motor. The further graph $\gamma+\epsilon$ shown in FIG. 9 is located above the lowest pump pressure and illustrates that the difference A will prevail at the orifice 6. The flow resistance C at the orifice 10 can again be deducted as the difference between the values of the graphs $\alpha_s$ and $\beta_s$. The difference D between the pressure $\gamma+\epsilon$ and the oil pressure $\epsilon$ corresponds to the flow resistance at the control edge 3k. The pressure difference E between the pressures $\gamma+\epsilon$ and $\beta_s$ designates the flow resistance at the control edge 3e and in the servomotor conduits.

The control becomes particularly simple if the closing chambers of motor 1 and motor 2 are through a conduit 21 subjected to a constant oil or water pressure as illustrated in FIG. 5. According to FIG. 5, the control valve 3 is designed for uni-lateral control. The opening chamber 1b of motor 1 is made equal to the opening chamber 2b of motor 2 by correspondingly dimensioning the cross section of piston rod 1d. Opening chamber 1b is adapted to communicate with opening chamber 2b through control valve 3. When a closing step is initiated by the turbine governor, control valve spool 30 moves downwardly so that oil will be able through annular passage 3i released by edge 3d to pass from chamber 2b of motor 2 through conduit 14 into opening chamber 1b of motor 1. As a result thereof, the pressure regulator is opened by the closing guiding apparatus. After valve spool 30 has been returned to its normal position, i.e. when the guide wheel is in its new position of rest, the pressure regulator again closes slowly while the oil from the opening chamber 1b is being discharged through conduit 14 and orifice 20.

Orifice 10 determines the closing period of the guiding apparatus, whereas orifice 13 in the feeding line 4 determines the opening period of the latter.

The pressure conditions of the arrangement according to FIG. 5 are the same as described in connection with FIGS. 3 and 8.

Figure 3A:
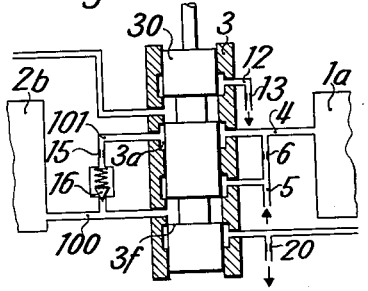
FIG. 3a is a slight modification over the arrangement of FIG. 3.

With the embodiments according to FIGS. 1a, 2a, and 3a, the pressure conditions of which substantially correspond to those of FIGS. 1, 2 and 3 respectively, a branch conduit 101 (FIG. 3a) is provided which branches off from opening conduit 100 of the guide wheel adjusting motor 2 and leads to the annular passage 3a of valve 3. Conduit 101 also comprises an orifice 15 and check valve 16. The provision of this branch conduit 101 will prevent the pressure from oscillating itself up due to load fluctuations, because the pressure regulator motor which after preceding decrease in load will still be in slow closing motion, will at succeeding increase in load, be able to close as fast as the guide wheel opens again. When during a load acting on the turbine, the valve spool 30 moves upwardly, control edge 3f allows the pressure oil fed through conduit 5 to pass through the opening chamber 2b of motor 2 and also to pass through the closing chamber 1a of motor 1 through orifice 15, the now open annular passage 3a and conduit 4. The pressure regulator will then receive its closing oil not only through conduit 5 and orifice 6 but also through conduit 100 and orifice 15 as a result of which it is able to close at a faster rate. Orifice 15 is to be dimensioned so that in cooperation with orifice 6 it will yield a pressure regulator closing time which corresponds substantially to the opening time of adjusting motor 2 for the guiding apparatus.

According to another modification illustrated in FIG. 4a, the control valve 30 of FIG. 4a is provided with an additional annular passage 3n arranged between the annular passages 3b and 3c, and with two additional control edges 3p and 3q. When valve spool 30 moves upwardly, control edge 3p allows pressure oil from conduit 5 to pass from passage or chamber 3b into passage or chamber 3n and from there through conduit 101 to the closing side 1a of adjusting motor 1 for the pressure regulator. At the same time, control edge 3q allows the oil on the opposite side 1b to discharge through conduit 17 and orifice 18. This discharge is arranged parallel to the normal discharge through conduit 9 and orifice 10, thereby allowing the pressure regulator to close at a faster speed.

According to the embodiment of FIG. 5a, control valve 3 is provided with an additional discharge 17 comprising an orifice 18, while the valve spool 30 is provided with an additional control edge 3m adapted to allow the oil to discharge from the opening chamber 1b of adjusting motor 1 for the pressure regulator. Thus, when the turbine is again subjected to a load and as a result thereof valve spool 30 moves upwardly, the oil from opening chamber 1b of motor 1 will be discharged not only through conduits 14 and 19 in conformity with the normal procedure but will also be discharged through orifice 10 and by the now open control edge 3m of annular chamber 3c as well as through conduit 17 and orifice 18. The cooperation of the orifices 10, 20 and 18 will thus yield a pressure regulator closing time which approximates the opening time for the guiding apparatus.

It is, of course, to be understood that the present invention is, by no means, limited to the particular constructions shown in the drawings but also comprises any modifications within the scope of the appended claims.

What I claim is:

1. A control system for use in connection with a water turbine having an adjustable guide wheel and receiving its actuating water from a pressure conduit provided with a pressure relief valve and said turbine also having a speed governor driven in unison therewith: said control system comprising a first hydraulically operable motor operatively connected to said guide wheel for adjusting the same and having a guide wheel closing side and a guide wheel opening side, a second hydraulically operable motor operatively connected to said pressure relief valve for adjusting the same and having a relief valve closing side and a relief valve opening side, conduit means adapted to establish fluid communication between at least two of the corresponding sides of said two motors, a source of pressure fluid connected to said conduit means for delivering pressure fluid for actuating said two motors, a control valve arranged in said conduit means, a valve member arranged in said control valve and moveable for controlling the flow of pressure fluid through said conduit means, said speed governor being operatively connected to said valve member for adjusting the same from its normal position when the speed of said turbine is changed, means to restore said valve member to its normal position in accordance with the adjustment of said guide wheel, said valve member being adapted in its normal position to interrupt fluid communication between said two motors and also between said first motor and said source of pressure fluid and also being adapted, when the speed of said turbine increases, to establish fluid communication between at least two of the corresponding sides of said two motors for permitting movement of said piston of said first motor in closing direction, and also permitting movement of said piston of said second motor in opening direction, said adjusting motors being so designed that with a closing movement of said guide wheel the fluid displaced from the opening side of said second motor by movement of its piston in the opening direction always approximately equals the quantity of fluid conveyed to said opening side of said first motor to move its piston in the closing direction.

2. A control system for use in connection with a water turbine having an adjustable guide wheel and receiving its actuating water from a pressure conduit provided with a pressure relief valve and said turbine also having a speed governor driven in unison therewith: said control system comprising a first hydraulically operable motor having a piston operatively connected to said guide wheel for adjusting the same and having a guide wheel closing side and a guide wheel opening side, a second hydraulically operable motor having a piston operatively connected to said pressure relief valve for adjusting the same and having a relief valve closing side and a relief valve opening side, conduit means adapted to establish fluid communication between at least two of the corresponding sides of said two motors, a source of pressure fluid connected to said conduit means for delivering pressure fluid for actuating said two motors, a control valve arranged in said conduit means, a valve member arranged in said control valve and moveable for controlling the flow of pressure fluid through said conduit means, said speed governor being operatively connected to said valve member for adjusting the same from its normal position when the speed of said turbine is changed, means to restore said valve member to its normal position in accordance with the adjustment of said guide wheel, said valve member being adapted in its normal position to interrupt fluid communication between said two motors and also between said first motor and said source of pressure fluid and also being adapted, when the speed of said turbine increases, to establish fluid communication between at least said two of the corresponding sides of said two motors for permitting movement of said piston of said first motor in closing direction, and also permitting movement of said piston of said second motor in opening direction, said adjusting motors being so designed that with a closing movement of said first motor for said guide wheel the difference between the quantities of fluid present in the opening sides of said two motors at the start and the end of said closing operation always approximately equals the quantity of fluid moved into the said closing side of said first motor during said closing operation.

3. A control system for use in connection with a water turbine having an adjustable guide wheel and receiving its actuating water from a pressure conduit provided with a pressure relief valve and said turbine also having a speed governor driven in unison therewith: said control system comprising a first hydraulically operable motor having a piston operatively connected to said guide wheel for adjusting the same and having a guide wheel closing side and a guide wheel opening side, a second hydraulically operable motor having a piston operatively connected to said pressure relief valve for adjusting the same and having a relief valve closing side and a relief valve opening side, conduit means adapted to establish fluid communication between at least two of the corresponding sides of said two motors, a source of pressure fluid connected to said conduit means for delivering pressure fluid for actuating said two motors, a control valve arranged in said conduit means, a valve member in said control valve moveable for controlling the flow of pressure fluid through said conduit means, said speed governor being operatively connected to said valve member for adjusting the same from its normal position when the speed of said turbine is changed, means to restore said valve member to its normal position in accordance with the adjustment of said guide wheel, said valve member being adapted in its normal position to interrupt fluid communication between said two motors and also between said first motor and said source of pressure fluid and also being adapted, when the speed of said turbine increases, to establish the fluid communication between said closing side of said first motor and said closing side of said second motor for permitting movement of said piston of said first motor in closing direction and also permitting movement of said piston of said second motor in opening direction, said valve member simultaneously establishing communication between said opening side of said first motor and an exhaust, said valve member also being adapted, when the speed of said turbine decreases, to establish fluid communication between said opening side of said first motor and said source of pressure fluid while establishing communication between said closing side of said first motor and said exhaust.

4. A control system according to claim 3, which includes means continuously establishing fluid communication between said source of pressure fluid and said closing side of said second motor, said source of pressure fluid being at a substantially constant pressure.

5. A control system according to claim 3, which includes a supply line for actuating oil under pressure, and means continuously establishing fluid communication between said supply line and said closing side of said second motor.

6. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor having a piston operatively connected to said guide wheel for adjusting the same and having a guide wheel closing side and a guide wheel opening side, a second pressure fluid motor having a piston and a piston rod operatively connected to said pressure relief valve for adjusting the same and having a relief valve closing side and a relief valve opening side, a source of pressure fluid, the diameter of said piston rod of said second motor being dimensioned in conformity with the pressure head of said source of pressure fluid, conduit means adapted to establish fluid communication between the closing sides of said two motors, a source of pressure fluid connected to said conduit means for delivering pressure fluid thereto for actuating said two motors, a control valve arranged in said conduit means, and an adjustable valve member arranged in said control valve and moveable for controlling the flow of pressure fluid through said conduit means, said speed governor being operatively connected to said valve member for adjusting the same from its normal position when the speed of said turbine is changed, means to restore said piston of said control valve to its normal position in accordance with the movement of said guide wheel, said valve member being adapted in its normal position to interrupt fluid communication between said two motors and also between said first motor and said source of pressure fluid and also being adapted, when the speed of said turbine increases, to establish fluid communication between said closing sides of said two motors for permitting movement of said piston of said first motor in closing direction, and also permitting movement of said piston of said second motor in opening direction with a simultaneous transfer of fluid between said motors.

7. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor having a piston operatively connected to said guide wheel for adjusting the same and having a guide wheel closing side and a guide wheel opening side, a second pressure fluid motor having a piston operatively connected to said pressure relief valve for adjusting the same and having a relief valve closing side and a relief valve opening side, conduit means adapted to establish fluid communication between at least two of the corresponding sides of said two motors, a source of pressure fluid connected to said conduit means for delivering pressure fluid for actuating said two motors, a control valve arranged in said conduit means, a valve member arranged in said valve and moveable for controlling the flow of pressure fluid through said conduit means, said speed governor being operatively connected to said valve member for adjusting the same from its normal position when the speed of said turbine is changed, means to restore said valve member to its normal position in accordance with the movement of said guide wheel, said valve member being adapted in its normal position to interrupt fluid communication between said two motors and also between said first motor and said source of pressure fluid, said valve member being so designed that during adjustment of said guide wheel in closing direction in accordance with an increase in the speed of said turbine, said valve member establishes fluid communication between said opening sides of said two motors.

8. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor operatively connected to said guide wheel for adjusting the same and having a guide wheel closing side and a guide wheel opening side, a second pressure fluid motor operatively connected to said pressure relief valve for adjusting the same and having a relief valve closing side and a relief valve opening side, conduit means adapted to establish fluid communication between at least two of the corresponding sides of said two motors, a source of pressure fluid connected to said conduit means for delivering pressure fluid for actuating said two motors, a control valve arranged in said conduit means, a valve member in said valve moveable for controlling the flow of pressure fluid through said conduit means, additional conduit means leading from opening chamber of said second motor to said control valve, said speed governor being operatively connected to said valve member for adjusting the same from its normal position when the speed of said turbine is changed, means to restore said valve member to its normal position in accordance with the movement of said guide wheel, said valve member being adapted in its normal position to interrupt fluid communication between said two motors and also between said first motor and said source of pressure fluid, said valve member being so designed that during adjustment of said guide wheel in closing direction in accordance with an increase in the speed of said turbine, said valve member establishes fluid communication between said opening sides of said two motors through said conduit means and also establishes fluid communication between the opening side of said second motor and said additional conduit means.

9. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor operatively connected to said guide wheel for adjusting the same and having a guide wheel closing side and a guide wheel opening side, a second pressure fluid motor operatively connected to said pressure relief valve for adjusting the same and having a relief valve closing side and a relief valve opening side, conduit means adapted to establish fluid communication between at least two of the corresponding sides of said two motors, a source of pressure fluid connected to said conduit means for delivering pressure fluid for actuating said two motors, a control valve arranged in said conduit means, a valve member forming part of said valve and being moveable to control the flow of pressure fluid through said conduit means, said speed governor being operatively connected to said valve member for adjusting the same from its normal position when the speed of said turbine is changed, means to restore said valve member to its normal position in accordance with the movement of said guide wheel, said valve member being adapted in its normal position to interrupt fluid communication between said two motors and also between said first motor and said source of pressure fluid, said valve member being so designed that during adjustment of said guide wheel in closing direction in accordance with an increase in the speed of said turbine, said valve member establishes fluid communication between said opening sides of said two motors, said motors being so designed that the displacement of said first motor approximately equals the displacement of said piston rod.

10. A control system for use in connection with a water turbine having an adjustable guide wheel and receiving its actuating water from a pressure conduit being provided with a pressure relief valve and said turbine also having a speed governor driven in unison therewith: said control system comprising a first pressure fluid motor operatively connected to said guide wheel for adjusting the same and having a guide wheel closing side and a guide wheel opening side, a second pressure fluid motor operatively connected to said pressure relief valve for adjusting the same and having a relief valve closing side and a relief valve opening side, first conduit means for conveying pressure fluid to the closing side of said second motor, an orifice arranged in said first conduit means, second conduit means adapted to establish fluid communication between the closing sides of said two motors, a source of pressure fluid connected to said first conduit means for delivering pressure fluid for actuating said two motors, a control valve arranged in said second conduit means, and an adjustable valve member forming part of said control valve and being moveable to control the flow of pressure fluid through said second conduit means, said speed governor being operatively connected to said valve member for adjusting the same from its normal position in accordance with the movement of said guide wheel, said valve member being adapted in its normal position to interrupt fluid communication between said two motors and also between said first motor and said source of pressure fluid and also being adapted, when the speed of said turbine increases, to establish fluid communication between the closing sides of said two motors for permitting movement of said piston of said first motor in closing direction, and also permitting movement of said piston of said second motor in opening direction.

11. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor having a piston operatively connected to said guide wheel for adjusting the same and having a guide wheel closing side and a guide wheel opening side, a second pressure fluid motor having a piston operatively connected to said pressure relief valve for adjusting the same and having a relief valve closing side and a relief valve opening side, conduit means adapted to establish fluid communication between corresponding sides of said two motors, a source of pressure fluid connected to said conduit means for delivering pressure fluid thereto for actuating said two motors, a control valve arranged in said conduit means, a valve member in said control valve moveable for controlling the flow of pressure fluid through said conduit means, said speed governor being operatively connected to said valve member for adjusting the same from its normal position when the speed of said turbine is changed, means to restore said valve member to its normal position in accordance with the movement of said guide wheel, additional conduit means establishing communication between the closing sides of said two motors, and a feeding conduit for pressure fluid communicating with said additional conduit means, said valve member being adapted in its normal position to interrupt fluid communication between said two motors and also between said first motor and said source of pressure fluid and also adapted, when the speed of said turbine increases, to establish fluid communication between corresponding sides of said two motors for permitting movement of said piston of said first motor in closing direction, and also permitting movement of said piston of said second motor in opening direction, said valve member being so designed that during adjustment of said guide wheel in closing direction in accordance with an increasing of the speed of said turbine said valve member establishes communication between the opening chambers of said two motors.

12. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor having a piston operatively connected to said guide wheel for adjusting the same and having a guide wheel closing side and a guide wheel opening side, a second pressure fluid motor having a piston being operatively connected to said pressure relief valve for adjusting the same and having a relief valve closing side and a relief valve opening side, first conduit means adapted to establish fluid communication between corresponding sides of said two motors, a source of pressure fluid connected to said conduit means for delivering pressure fluid thereto for actuating said two motors, a control valve arranged in said first conduit means, a valve member moveable in said control valve for controlling the flow of pressure fluid through said first conduit means from one motor to the other motor, second conduit means leading from the opening side of said second motor to said control valve, third conduit means leading from said second conduit means to a discharge, an orifice arranged in said third conduit means, said speed governor being operatively connected to said valve member for adjusting the same from its normal position when the speed of said turbine is changed, means to restore said piston of said control valve to its normal position in accordance with the movement of said guide wheel, said valve member being adapted in its normal position to interrupt fluid communication between said two motors and also between said first motor and said source of pressure fluid and also being adapted, when the speed of said turbine increases, to establish fluid communication between corresponding sides of said two motors for permitting movement of said piston of said first motor in closing direction, and also permitting movement of said piston of said second motor in opening direction.

13. A control system for use in connection with a water turbine having an adjustable guide wheel and receiving its actuating water from a pressure conduit being provided with a pressure relief valve and said turbine also having a speed governor driven in unison therewith: said control system comprising a first pressure fluid motor having a piston operatively connected to said guide wheel for adjusting the same and having a guide wheel closing side and a guide wheel opening side, a second pressure fluid motor having a piston operatively connected to said pressure relief valve for adjusting the same and having a relief valve closing side and a relief valve opening side, conduit means adapted to establish fluid communication between at least two corresponding sides of said two motors, a source of pressure fluid connected to said conduit means for delivering pressure fluid thereto for actuating said two motors, a control valve arranged in said conduit means, said control valve having a valve member moveable therein for controlling the flow of pressure fluid through said conduit means from one motor to the other motor, said speed governor being operatively connected to said valve member for adjusting the same from its normal position when the speed of said turbine is changed, means to restore said valve member to its normal position in accordance with the movement of said guide wheel, said valve member being adapted in its normal position to interrupt fluid communication between said two motors and also between said first and said source of pressure fluid and also being adapted, when the speed of said turbine increases, to establish fluid communication between said two corresponding sides of said two motors for permitting movement of said piston of said first motor in closing direction, and also permitting movement of said piston of said second motor in opening direction, supply conduit means leading to said control valve and the closing side of said second motor, and additional conduit means leading from the opening side of said first motor to said control valve, the arrangement being such that by adjustment of said guide wheel in opening direction in accordance with a decrease in the speed of said turbine, said valve member establishes communication between said additional conduit means and said supply conduit means so that said second motor will move in closing direction as fast as the guide wheel opens.

14. A system according to claim 13, which includes a check valve arranged in said additional conduit means, and an orifice between said check valve and said control valve whereby said additional conduit means receives pressure fluid through said check valve when said guide wheel is adjusted in opening direction only while the incoming quantity of pressure fluid is determined by said orifice.

15. A system according to claim 13, in which said valve member allows the passage of pressure fluid to said additional conduit means during the adjustment of said guide wheel in opening direction only.

16. A control system for use in connection with a water turbine having an adjustable guide wheel and receiving its actuating water from a pressure conduit provided with a pressure relief valve and said turbine also having a speed governor driven in unison therewith: said control system comprising a first pressure fluid motor having a piston operatively connected to said guide wheel for adjusting the same and having a guide wheel closing side and a guide wheel opening side, a second pressure fluid motor having a piston operatively connected to said pressure relief valve for adjusting the same and having a relief valve closing side and a relief valve opening side, conduit means adapted to establish fluid communication between at least two corresponding sides of said two motors, a source of pressure fluid connected to said conduit means for delivering pressure fluid thereto for actuating said two motors, a control valve arranged in said conduit means, said control valve having a valve member moveable therein for controlling the flow of pressure fluid through said conduit means, said speed governor being operatively connected to said valve member for adjusting the same from its normal position when the speed of said turbine is changed, means to restore said valve member to its normal position in accordance with the movement of said guide wheel, said valve member being adapted in its normal position to interrupt fluid communication between said two motors and also between said first motor and said source of pressure fluid and also being adapted, when the speed of said turbine increases, to establish fluid communication between said two corresponding sides of said two motors for permitting movement of said piston of said first motor in closing direction, and also permitting movement of said piston of said second motor in opening direction, first discharge conduit means leading from the opening side of said second motor to a discharge, a first orifice in said first discharge conduit means, a branch conduit leading from said valve to a discharge, and a second orifice in said second discharge conduit means, said valve member being operable in response to said guide wheel being adjusted in opening direction to establish fluid communication between said branch conduit and said second discharge conduit means.

17. A control system for use in connection with a water turbine having an adjustable guide wheel means and a water supply conduit with a relief valve means and said turbine also having a speed governor driven in unison therewith: said control system comprising a first hydraulic motor connected to said guide wheel means, a second hydraulic motor connected to said relief valve means, each hydraulic motor having a first side responsive to pressure to move the means connected thereto in the closing direction and having a second side arranged in opposition to said first side, a source of fluid under pressure, a first conduit having a restrictor therein connecting said source with said first side of said second motor, a control valve, connections from said control valve to the said first and second sides of said first motor and to the opposite sides of said restrictor and to an exhaust, a valve member in the control valve controlling said connection, said governor being connected with said valve member for moving the valve member in response to changes in speed of the turbine, said valve member normally closing off all said connections and when moved by an increase in turbine speed connecting said first side of said first motor with the side of said restrictor toward said first motor while connecting the second side of said first motor with said exhaust, said valve member when moved by a decrease in turbine speed connecting said first side of said first motor with said exhaust and connecting said second side thereof with the side of said restrictor toward said source, said motors having substantially equal displacements.

18. A control system for use in connection with a water turbine having an adjustable guide wheel means and a water supply conduit with a relief valve means and said turbine also having a speed governor driven in unison therewith: said control system comprising a first hydraulic motor connected to said guide wheel means, a second hydraulic motor connected to said relief valve means, each hydraulic motor having a first side responsive to pressure to move the connected means in the closing direction and having a second side arranged in opposition to said first side, a source of fluid under pressure, a first conduit having a restrictor therein connecting said source with said first side of said second motor, a control valve, connections from said control valve to the said first and second sides of said first motor and to the opposite sides of said restrictor and to exhaust, a valve member forming part of said control valve and controlling said connection, said governor being connected to said valve member for moving the valve member in response to changes in speed of the turbine, said valve member normally closing off all of said connections and when moved by an increase in turbine speed connecting said first side of said first motor with the side of said restrictor toward said first motor while connecting the second side of said first motor with an exhaust, said valve member when moved by a decrease in turbine speed connecting said first side of said first motor with said exhaust and connecting said second side thereof with the side of said restrictor toward said source, said motors having substantially equal displacements, and means operatively connected between said guide wheel means and said valve member and responsive to adjusting movement of said guide wheel means by said first motor for moving said valve member in a direction opposite to the movement thereof by said governor that produced the said guide wheel movement.

19. A control system for use in connection with a water turbine having an adjustable guide wheel means and a water supply conduit with a relief valve means and said turbine also having a speed governor driven in unison therewith: said control system comprising a first hydraulic motor connected to said guide wheel means, a second hydraulic motor connected to said relief valve means, each hydraulic motor having a first side responsive to pressure to move the means connected thereto in the closing direction and having a second side arranged in opposition to said first side, a source of fluid under pressure, a first conduit having a restrictor therein connecting said source with said first side of said second motor, a control valve, connections from said control valve to the said first and second sides of said first motor and to the opposite sides of said restrictor and to exhaust, a valve member arranged in the control valve and controlling said connection, said governor being connected to said valve member for moving the valve member in response to changes in speed of the turbine, said valve member normally closing off all said connections and when moved by an increase in turbine speed connecting said first side of said first motor with the side of said restrictor toward said first motor while connecting the second side of said first motor with exhaust, said valve member when moved by a decrease in turbine speed connecting said first side of said first motor with an exhaust and connecting said second side thereof with the side of said restrictor toward said source, said motors having substantially equal displacements, and means operatively connected between said guide wheel means and said valve member and responsive to adjusting movement of said guide wheel means by said first motor for moving said valve member in a direction opposite to the movement thereof by said governor that produced the said guide wheel movement, said connection to said exhaust from said control valve comprising first and second exhaust conduits having restrictors therein and each conduit being effective for exhausting one only of said first and second sides of said first motor.

20. A control system for use in connection with a water turbine having an adjustable guide wheel means and a water supply conduit with a relief valve means and said turbine also having a speed governor driven in unison therewith: said control system comprising a first hydraulic motor connected to said guide wheel means, a second hydraulic motor connected to said relief valve means, each hydraulic motor having a first side responsive to pressure to move the means connected thereto in the closing direction and having a second side arranged in opposition to said first side, a source of fluid under pressure, a first conduit having a restrictor therein connecting said source with said first side of said second motor, a control valve, connections from said control valve to the said first and second sides of said first motor and to the opposite sides of said restrictor and to exhaust, a valve member arranged in said control valve and controlling said connection, a governor driven by said turbine and connected to said valve member for moving the valve member in response to changes in speed of the turbine, said valve member normally closing off all of said connections and when moved by an increase in turbine speed connecting said first side of said first motor with the side of said restrictor toward said first motor while connecting the second side of said first motor with an exhaust, said valve member when moved by a decrease in turbine speed connecting said first side of said first motor with said exhaust and connecting said second side thereof with the side of said restrictor toward said source, said motors having substantially equal displacements, and means operatively connected between said guide wheel means and said valve member and responsive to adjusting movement of said guide wheel means by said first motor for moving said valve member in a direction opposite to the movement thereof by said governor that produced the said guide wheel movement, the said second side of said second motor being smaller in area than the said first side thereof and being connected with the side of said restrictor toward said source.

References Cited in the file of this patent

UNITED STATES PATENTS

| | | |
|---|---|---|
| 1,202,310 | Pfau | Oct. 24, 1916 |
| 1,309,808 | Pfau | July 15, 1919 |
| 2,338,548 | Sheppard | Jan. 4, 1944 |
| 2,560,914 | Almeras | July 17, 1951 |
| 2,647,493 | Whitehead et al. | Aug. 4, 1953 |
| 2,681,660 | Avery | June 22, 1954 |
| 2,824,549 | Whitehead | Feb. 25, 1958 |
| 2,938,527 | Nichols | May 31, 1960 |

FOREIGN PATENTS

| | | |
|---|---|---|
| 88,385 | Sweden | Jan. 26, 1937 |